E. P. WELCH.

Middlings Purifiers.

No. 5,346

Reissued April 1, 1873.

Witnesses:
J. C. Brecht
O. E. Duff

Inventor:
E. P. Welch

N. PETERS, PHOTO-LITHOGRAPHER, WASHINGTON, D. C.

UNITED STATES PATENT OFFICE.

EDWARD P. WELCH, OF GEORGETOWN, D. C., ASSIGNOR TO HIMSELF, JAMES H. WELCH, ROSIA W. WELCH, HERBERT P. WELCH, AND JAMES A. MALONEY, OF SAME PLACE.

IMPROVEMENT IN MIDDLINGS-PURIFIERS.

Specification forming part of Letters Patent No. 135,953, dated February 18, 1873; Reissue No. 5,346, dated April 1, 1873.

*To all whom it may concern:*

Be it known that I, EDWARD PRICE WELCH, of Georgetown, in the District of Columbia, have invented certain new and useful Improvements in Machinery for Purifying Middlings, of which the following is a specification:

My invention relates to that class of machinery for dressing flour in which a current of air is passed through screens, which sift and separate the various grades of middlings, and a brush is used to clear and keep open the meshes of the screens.

My invention consists, first, in combining, with the screen or sieve, a perforated pipe or pipes, through which a blast of air, independent of the ordinary one passing upward through the sieve, which is also used, is forced, for the purpose of blowing off the fine adhering farina on the under side of the sieve, and for keeping its meshes always open; second, in combining, with the above, a rotary brush or brushes, on axes perpendicular to the sieve, so that they may rotate across its face, while the sieve is vibrating across the brush, thus producing a scouring action, which is very effective in entirely clearing the meshes of the sieve from any clogging matter.

Figure 1:
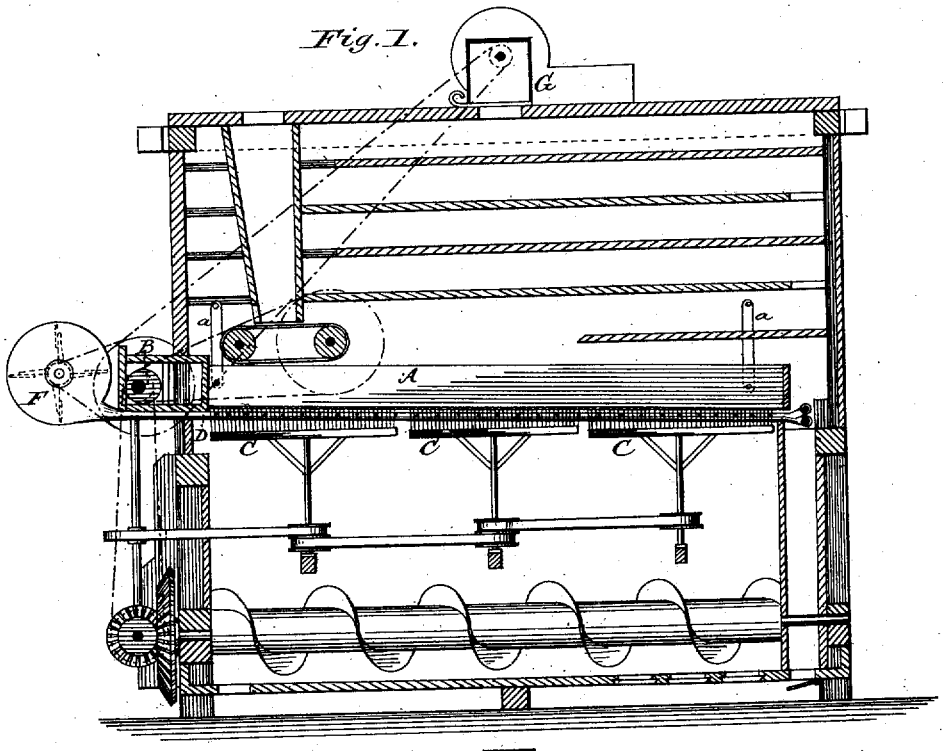
Figure 2:
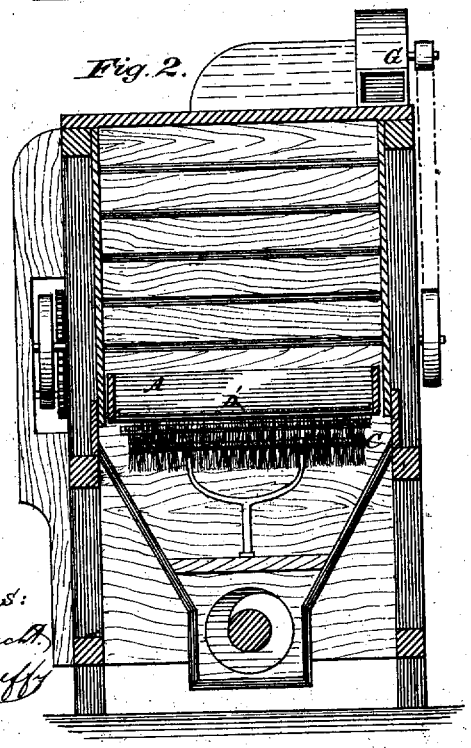

In the accompanying drawing, Figure 1 represents a vertical longitudinal section; Fig. 2, a vertical transverse section through a middlings-purifier.

The construction of the various parts of the machine being well understood by skillful constructers of milling machinery, their details need not be particularly described here.

A screen, A, is suspended by radius-links *a*, and vibrated by an eccentric, B, or other suitable means.

Beneath this screen, composed of several numbers of cloths, I mount a rotary brush, C, on an axis perpendicular to the face of the screen, and drive it by suitable belts or gearing, so that it may rotate across the under side of the screen, which at the same time is vibrating across the brush, thus producing a diagonal drawing, scouring movement, which I have found very effective in clearing the meshes of the screen from clogging matter. Any number of brushes desired may be used, according to the size of the screen.

Instead of a simple brush revolving on the axis, roller-brushes might be mounted on horizontal axes in the brush-head, as shown in Fig. 2, so as to have a compound rotating motion—one with the vertical axis, the other on the horizontal axis.

D is an air-pipe extending longitudinally beneath the sieve, having numerous cross-pipes, D′, at suitable intervals.

F is a fan-blower, independent of the exhaust-fan G, for forcing air through the pipe D, and its branches D′, through numerous small perforations in said pipes, upon and against both the screen and brush, to clear them of obstructions and keep the meshes open.

The brushes, having long and flexible bristles, readily pass over the pipes which are interposed between the brushes and screen.

The pipes may be extended around the sides and end of the screen, near the tail end thereof, so as to prevent the too rapid discharge of the material at the tail end.

G is the exhaust-fan for drawing currents of air through the screen, as usual.

The operation of my improved apparatus will readily be understood from the foregoing description.

I do not claim a vibrating screen with a blast passing through it, nor, broadly, the combination of a screen with a clearing-brush.

I claim as my invention—

1. The combination, in a middlings-purifier, of a screen or sieve, through which a blast passes in one direction, while the middlings pass in the other, with auxiliary air-pipe with jets from an independent fan-blower, substantially as hereinbefore set forth, to blow off fine adhering farina, &c., from its under side, to keep the meshes clear and open, and prevent their clogging.

2. The combination, in a middlings-purifier, of a vibrating screen, through which a blast passes in one direction, while the middlings pass in the other, with a brush rotating across the under side of the screen, on an axis substantially perpendicular thereto, substantially as hereinbefore set forth, to produce a drawing action of the brush across the screen diagonal to its line of vibration.

3. The combination, in a middlings-purifier, of a vibrating screen, brushes rotating across the under side of the screen, and perforated air-pipes, to direct streams of air upon the screen and brush, substantially as set forth.

In testimony whereof I have hereunto signed my name.

EDWARD P. WELCH.

Witnesses:
T. C. BRECHT,
O. E. DUFFY.